United States Patent

[11] 3,600,994

| [72] | Inventor | Jean Zapater<br>Ganges, France |
|---|---|---|
| [21] | Appl. No. | 876,878 |
| [22] | Filed | Nov. 14, 1969 |
| [45] | Patented | Aug. 24, 1971 |
| [73] | Assignee | Societe Rhodiaceta<br>Paris, France |
| [32] | Priority | Nov. 15, 1968 |
| [33] | | France |
| [31] | | 173992 |

[54] APPARATUS FOR CUTTING OUT A NECK-PORTION OPENING FROM AN ARTICLE OF CLOTHING
6 Claims, 3 Drawing Figs.

[52] U.S. Cl. .................................................. 83/100,
83/167, 83/171, 83/522
[51] Int. Cl. .................................................. B26d 7/06
[50] Field of Search .......................................... 83/100,
171, 16, 522, 167; 33/11

[56] References Cited
UNITED STATES PATENTS

| 1,793,089 | 2/1931 | Heyes.......................... | 83/171 X |
|---|---|---|---|
| 2,704,123 | 3/1955 | Williams...................... | 83/171 |

FOREIGN PATENTS

| 1,172,461 | 10/1958 | France ........................ | 83/171 |

*Primary Examiner*—Frank T. Yost
*Attorney*—Stevens, Davis, Miller & Mosher

ABSTRACT: Apparatus for cutting the neck portion opening of an article of clothing, e.g. a pullover, of thermoplastic material including a hollow, bust-shaped former having an aperture in the flattened upper portion thereof. A transparent reference plate is used to locate the pullover on the former, and a heated cutter within the former is raised to cut out the neck portion. The waste material is removed downwardly through a suction tube.

Patented Aug. 24, 1971

3,600,994

Inventor
JEAN ZAPATER
By Stevens, Davis, Miller & Mosher
Attorney

APPARATUS FOR CUTTING OUT A NECK-PORTION OPENING FROM AN ARTICLE OF CLOTHING

The present invention relates to apparatus for cutting out a neck portion opening from an article of clothing, e.g. a pullover, made of threads or yarns or of chemical fibers, alone or mixed with natural fibers.

During the manufacture of knitted articles of the pullover-type, it is necessary, after knitting the various parts of the articles, to cut out the neck portion. To this end, the contours of the neck are marked on the pullover, for example with the aid of a textile pencil. The design is drawn with the aid of a textile pencil. The design is drawn with the aid of reference means such as needles, providing for correct positioning of the neck, the positioning of the said reference means being determined by superposing the symmetrical portions of the knitted fabric obtained, this being done by folding the upper portions of the pullover along a line intermediary of the shoulder line. The neck is then cut out with scissors, following the design or drawing. This operation, since it is entirely manual and also an extremely delicate operation, requires a considerable amount of skilled labor, which is of course costly, and it is for this reason that, although technically acceptable, this process is not satisfactory from an economic viewpoint.

According to the present invention, there is provided apparatus for cutting out a neck portion opening of an article of clothing, e.g. a pullover, made from a thermoplastic material, said apparatus comprising a rigid, hollow former having the shape of the bust portion of a dummy, a flattened upper part of the former being provided with an aperture which is slightly larger than the neck portion opening to be cut, a heated cutter having a closed shape conforming to that of the neck portion opening, the cutter being vertically displaceable at least partly through the aperture in the former, and transparent reference means arranged to enable the article to be located accurately on the former.

The hollow former, preferably having a smooth surface, on which a pullover is located, is of generally round or elliptical cross section, conforming to the shape of the pullover. The upper portion of the former is folded down in the manner of a rounded portion of large radius, the edges of which are located substantially in a horizontal plane. The edges constitute the aperture, the shape of which may be as desired provided that its dimensions are slightly larger than those of the largest portion of material which it is required to cut out. The form thus described may be secured at its lower portion to a frame permitting the positioning of other parts of the apparatus within the former. The securing of the form to the frame is such that one form may be replaced by another.

The cutter may comprise a heating resistance having the shape of a plane, closed line corresponding substantially to the contours of the portion of material to be cut off. This shape varies, for example for pullovers, depending on whether what it is desired to produce is a flat neck, a rolled neck, open neck, a polo neck for a gentleman or for a lady, a V-neck, a neck for a cardigan, etc. Optionally, the form may carry reference means, notably for cutting out the neck, so as to facilitate the mending of the stitches or the affixing of the sliding clasp fastener.

The heating resistance may be mounted on a support, having for example the shape of a plane annulus and connected by flexible conductive wires to a source of electric current, for example DC current. This assembly, disposed within the hollow mould, is vertically displaceable, for example axially of the former, between an upper working position at the level of the apex of the former and a lower, inoperative position. The cutter may be vertically displaced by any appropriate means, such as a foot pedal or a pneumatic jack, through intermediary of known connecting means.

Below the cutter there may be disposed a waste collector tube which is vertically displaceable, preferably following the axis of the mould, and advantageously, moving integrally with the cutter.

Furthermore, there may be arranged, secured to the frame and below the collector, suction means conveying the waste material into a recovery means. Preferably, the inlet for the suction means disposed near the collector is a tube which is coaxial relatively to the collector and the diameter of which is only slightly different, so that it is able to slide with the suction tube. Disposed at the outlet of the suction means is an auxiliary conduit provided with a retractable blocking operatively connected to the cutter, in such manner that it is closed when the cutter is in the working position and open when the resistance is in the inoperative position.

A horizontal, transparent centering plate carrying co-ordinates for determining, on the material disposed on the former, the positioning of the portion to be cut out, disposed above the flattened part of the former, so as to be laterally retractable or may be retracted by rocking and is rendered vertically displaceable through intermediary of a telescopic device, with the aid of a foot pedal disposed at the side of the pedal for controlling the operation of the cutter, but independently thereof, or with the aid of a jack or any other known, equivalent device.

In order that the invention will be more readily understood, the following description is given, merely by way of example, reference being made to the accompanying drawings, in which.

Figure 1:
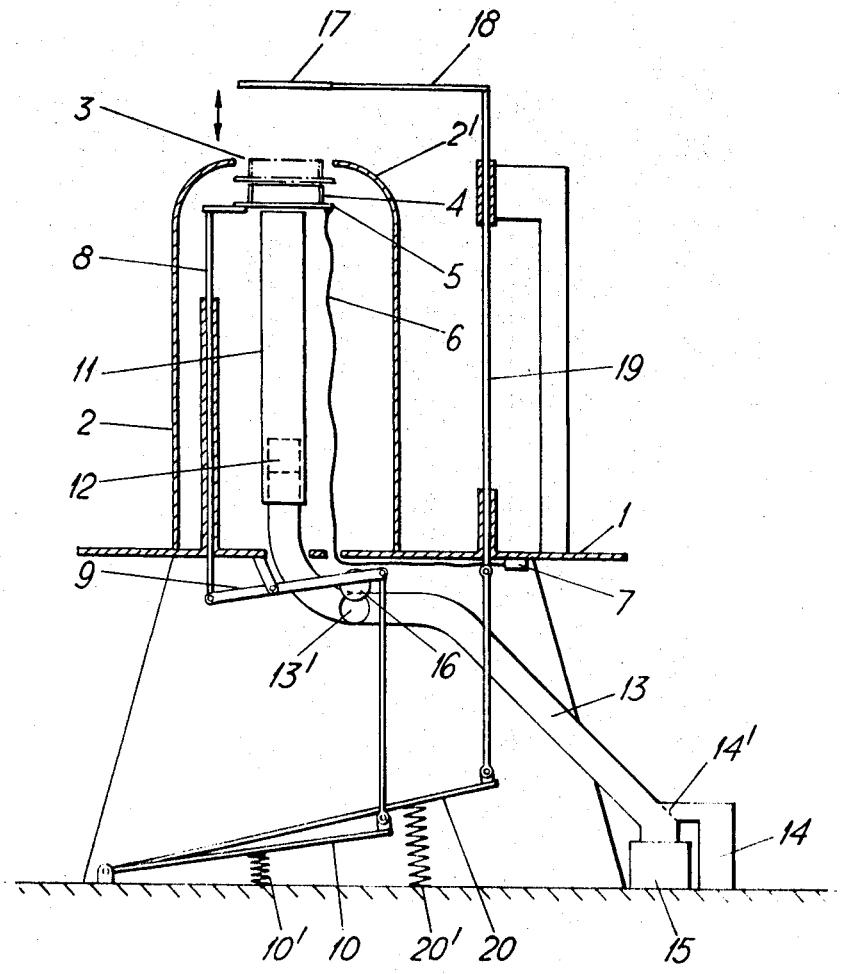
FIG. 1 is a schematic, sectional side elevation of one embodiment of apparatus according to the invention.

Referring to FIG. 1, a frame 1 supports a former 2 made of steel and has the shape of the bust of a dummy, and has a rounded or flattened part 2' the edge of which defines an aperture 3 located in a horizontal plane. Disposed within the former 2 is an electrical resistance 4, to form a heated cutter, mounted on a support 5 from which extend flexible wires 6 connected to a source of current 7. The support 5 is connected to a rod 8 articulated to a lever 9 connected to the frame 1 and actuated by a pedal 10 provided with a return spring 10'. Fixed to the lower face of the support 5 is a cylindrical, waste collector tube 11 sliding vertically on a tube 12 connected, via a conduit 13, to a suction device 14 provided with a filter 14', for preventing the waste material from entering the device 14. The conduit 13 opens into a waste recovery container 15. Intermediate its ends, the conduit 13 has an auxiliary conduit 13' the aperture in which is regulated by the blocking valve 16 carried by the lever 9. Furthermore, a transparent plate 17, made for example from "Plexiglass" and secured to the rod 18, is mounted in such manner that it is able to pivot on the rod 19 articulated to a pedal 20 provided with a return spring 20'. The length of the horizontal portion of the rod 18 is such that the plate 17 is disposed in the vertical axis of the aperture 3.

Figure 2:
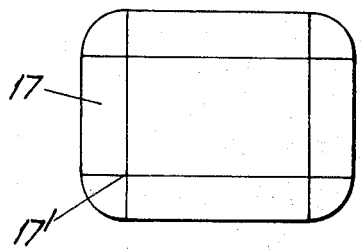
FIG. 2 is a plan view of the centering plate.

FIG. 2 is a plan view of the plate 17 on which the reference coordinates 17' have been drawn.

Figure 3:
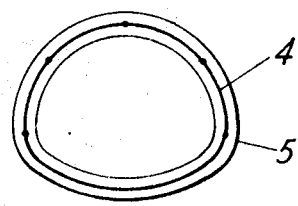
FIG. 3 is a plan view of the cutting means.

FIG. 3 is a plan view of the cutter, separated from the remainder of the device. The cutter comprises a resistor 4, the shape of which permits the cutting-out of so-called "round" necks, and the annular support 5.

The apparatus is operated by an operator seated to the left of the apparatus as seen in FIG. 1, in such manner as to face the pedals 10 and 30. The operator commences by fitting the pullover on the aperture 3; in order to do this, he engages the pullover on the former 2 in such manner that the position of the neck in the upper portion of the pullover is located approximately above the aperture 3. Then, by actuating the pedal 20, he lowers the plate 17 as near as possible to the pullover without, however, contacting it. The conduit 13' is then open, so that the suction effect in the collector tube 11 is small, this being necessary so as not to draw the pullover downwardly during positioning. With the aid of the coordinates 17', the operator adjusts the position of the pullover by sliding the latter on the surface of the former 2, and then he releases the pedal 20 which, under the action of the spring 20', returns to its starting position. Then, whilst maintaining the pullover in position with the aid of his hands, he depresses the pedal 10, the blocking means 16 closes the conduit 13' and the cutter 4 is displaced into the upper position shown in dotted lines in FIG. 1. The cutter then cuts out the neck portion opening and the cutout piece of material, is sucked via collector tube 11 by the device 14, and drops into the container 15.

Simultaneously, the fumes resulting from the cut are removed from the place of cutting, thus eliminating any possibility of odor. The operator then releases the pedal 10 which, under the action of the spring 10', returns to its starting position. Consequently, the cutter 4 returns into the inoperative position and the blocking valve 16 frees the apertures in the conduit 13', whereupon the suction force once again becomes weak.

The operator is then able to withdraw the pullover and to process a fresh pullover.

The above described apparatus is robust and simple and requires practically no maintenance. The manipulation thereof requires no skilled labor. Furthermore, the device has numerous advantages with regard to uniformity of cut and above all to the output achievable with it, this output being, per operator, several times greater than that achieved employing the prior processes involving manual cutting out.

I claim:

1. Apparatus for cutting out a neck portion opening of an article of clothing made from a thermoplastic material, said apparatus comprising, in combination:

a. a rigid, hollow former, having the shape of the bust portion of a dummy;
b. a flattened upper part to said former;
c. an aperture defined in said upper part, said aperture being slightly larger than said neck portion opening;
d. a heated cutter having a closed shape conforming to that of said neck portion opening;
e. means to move said heated cutter vertically with respect to said former and at least partly through said aperture in said former;
f. transparent reference means effective to enable the article to be located accurately on said former.

2. Apparatus as defined in claim 1, wherein said heated cutter includes an electrical resistance heater.

3. Apparatus as defined in claim 1, and further comprising means to move said reference means relative to said former.

4. Apparatus as defined in claim 1, wherein said heated cutter is located within said hollow former.

5. Apparatus as defined in claim 4 and further comprising a waste collector tube disposed within said former below said heated cutter, effective to receive material cut out thereby.

6. Apparatus as defined in claim 5 and further comprising suction means connected to said waste collector tube, and means operatively connected to said heated cutter moving means, effective to apply suction to said waste collector only when said heated cutter is raised to pass at least partly through said aperture in said former.